(12) United States Patent
Mahendra et al.

(10) Patent No.: US 12,542,614 B2
(45) Date of Patent: Feb. 3, 2026

(54) VIRTUAL CABLE CALIBRATION IN OVER THE AIR CONFORMANCE TESTING

(71) Applicant: Nokia Technologies Oy, Espoo (FI)

(72) Inventors: Rachit Mahendra, Khairabad (IN); Axel Mueller, Massy (FR); Christian Rom, Aalborg (DK); Karsten Petersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 1 day.

(21) Appl. No.: 18/798,821

(22) Filed: Aug. 9, 2024

(65) Prior Publication Data

US 2025/0055575 A1 Feb. 13, 2025

(30) Foreign Application Priority Data

Aug. 11, 2023 (IN) .............................. 202341053907

(51) Int. Cl.
| | |
|---|---|
| *H04B 17/00* | (2015.01) |
| *G01R 29/08* | (2006.01) |
| *H04B 17/24* | (2015.01) |
| *H04L 25/02* | (2006.01) |

(52) U.S. Cl.
CPC ..... *H04B 17/0087* (2013.01); *G01R 29/0878* (2013.01); *H04B 17/24* (2015.01); *H04L 25/0202* (2013.01)

(58) Field of Classification Search
CPC .. H04B 17/0087; H04B 17/24; H04B 17/309; H04B 17/3912; G01R 29/0878; H04L 25/0202
See application file for complete search history.

(56) References Cited

U.S. PATENT DOCUMENTS

| | | | | |
|---|---|---|---|---|
| 10,601,695 | B2 * | 3/2020 | Kyosti | .................... H04L 43/12 |
| 10,805,017 | B2 * | 10/2020 | Chervyakov | .......... H04B 17/18 |
| 2019/0334637 | A1 * | 10/2019 | Koebele | ............... H04B 17/364 |
| 2022/0006537 | A1 * | 1/2022 | Rodriguez-Herrera | ...................... H04B 17/15 |
| 2022/0140918 | A1 * | 5/2022 | Mellein | .............. H04B 17/0085 370/252 |
| 2023/0171009 | A1 * | 6/2023 | Han | ....................... H04B 17/15 370/252 |

* cited by examiner

*Primary Examiner* — Jean B Corrielus
(74) *Attorney, Agent, or Firm* — Barta Jones, PLLC

(57) ABSTRACT

Various example embodiments relate to devices, methods, apparatuses and computer readable mediums for virtual cable calibration in over the air conformance testing. In an example embodiment, a terminal device may receive training signals from at least four probes, estimate a channel based on the received training signals, and transmit a representation of the estimated channel to a test equipment coupled to the at least four probes. The terminal device and the at least four probes are positioned in a testing chamber. The estimated channel includes an over the air, OTA, channel portion between the at least four probes and the terminal device. The representation of the estimated channel is transmitted to the test equipment for compensation of the OTA channel portion.

20 Claims, 7 Drawing Sheets

1000

1100

VIRTUAL CABLE CALIBRATION IN OVER THE AIR CONFORMANCE TESTING

TECHNICAL FIELD

Various example embodiments described herein generally relate to communication technologies, and more particularly, to devices, methods, apparatuses and computer readable mediums for virtual cable calibration in over the air (OTA) conformance testing.

BACKGROUND

Certain abbreviations that may be found in the description and/or in the figures are herewith defined as follows:
3GPP Third Generation Partnership Project
CSI-RS Channel State Information Reference Signal
DUT Device Under Test
FR1 Frequency Range 1
FR2 Frequency Range 2
MIMO Multiple Input Multiple Output
mTRP multiple Transmit and Receive Point
Multi-Rx Multiple Reception
NAS Non Access Stratum
OTA Over The Air
QCL Quasi Co-Located
RAN4 Radio Access Network Working Group 4
RAN5 Radio Access Network Working Group 5
RSRP Reference Signal Received Power
UE User Equipment
VCC Virtual Cable Calibration Within 3GPP, Radio Access Network Working Group 4 (RAN4) is responsible for defining radio frequency (RF) requirements for both base stations and user equipment (UE), and RAN5 is responsible for developing conformance test specifications for UE. The RF requirements in Frequency Range 1 (FR1) are verified by traditional conducted testing methods which use transmission lines e.g. coaxial cables to connect a device under test (DUT) to a test system. In contrast, the Frequency Range 2 (FR2) RF requirements are verified by over the air (OTA) testing approaches because mm Wave antennas are directly bonded to RF front-end amplifiers and there is no antenna connector, which makes connecting the DUT to the test system by cables physically impossible. In addition, beamforming is used in FR2 to overcome high path loss and line-of-sight blockage. The OTA testing approaches are needed for beam characterization and for checking beam acquisition and beam tracking performance.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a terminal device is provided. The terminal device may comprise at least one processor and at least one memory. The at least one memory stores instructions which, when executed by the at least one processor, cause the terminal device at least to receive training signals from at least four probes, estimate a channel based on the received training signals, and transmit a representation of the estimated channel to a test equipment coupled to the at least four probes. The terminal device and the at least four probes are positioned in a testing chamber. The channel includes an over the air, OTA, channel portion between the at least four probes and the terminal device. The representation of the estimated channel is transmitted to the test equipment for compensation of the OTA channel portion.

In a second aspect, an example embodiment of a test equipment is provided. The test equipment may comprise at least one processor and at least one memory. The at least one memory stores instructions which, when executed by the at least one processor, cause the test equipment at least to transmit training signals to a terminal device through at least four probes, receive, from the terminal device, a representation of a channel as estimated by the terminal device, the channel including an over the air, OTA, channel portion between the at least four probes and the terminal device, derive, from the channel representation, a virtual cable calibration matrix for compensation of the OTA channel portion, and compensate for the OTA channel portion using the virtual cable calibration matrix. The terminal device and the at least four probes are positioned in a testing chamber.

Example embodiments of methods, apparatuses and computer readable mediums for virtual cable calibration in over the air (OTA) conformance testing are also provided. Such example embodiments generally correspond to the above example embodiments of the terminal device and the test equipment, and a repetitive description thereof is omitted here for convenience.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

Figure 1:
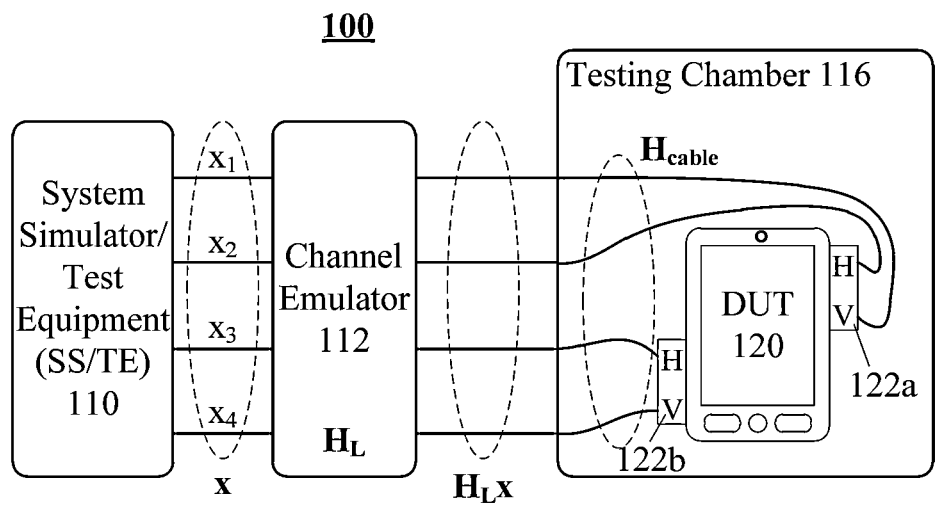
FIG. 1 is a schematic block diagram illustrating a conducted test system.

FIG. 1 schematically illustrates a legacy conducted test system 100 for FR1 requirements verification. As shown in FIG. 1, the test system 100 may include test equipment (TE) 110, a channel emulator 112, a testing chamber 116, and a device under test (DUT) 120. The channel emulator 112 and the testing chamber 116 are shown as separate devices in FIG. 1, but they may be integrated as a part of the test equipment 110.

The test equipment 110 may include a system simulator (SS), which simulates behaviours of a base station e.g. an evolved Node-B (eNB) or a next generation Node-B (gNB). The DUT 120, which may be implemented as user equipment (UE) (also known as terminal device), is positioned in the testing chamber 116 and cable-connected to the channel emulator 112 and in turn to the test equipment 110. In the example shown in FIG. 1, the DUT 120 has two H and V dual-polarized antenna panels/modules 122a, 122b. FIG. 1 shows an example 4×4 system where four Rx antenna ports of the DUT 120 are cable-connected via the channel emulator 112 to four Tx antenna ports of the test equipment 110, respectively. The test equipment 110 generates four signals x1, x2, x3, x4 and transmits the signals from the four Tx antenna ports via the channel emulator 112 to the four Rx antenna ports of the DUT 120. The channel emulator 112 simulates a wireless channel represented by a channel matrix $H_L$, which mixes the received signals x1, x2, x3, x4 and generates a linear combination of the signals x1, x2, x3, x4 at each output of the channel emulator 112. The number of output branches of the channel emulator 112 depends on the number of RX antenna ports, or antenna connectors, present at the DUT 120, which is 4 in the example shown in FIG. 1. Then the linear combination signals are transmitted from the output branches of the channel emulator 112 via cables to the four Rx antenna ports of the DUT 120.

Since the signals are transmitted through cables, they are well isolated from each other and there is no crosstalk/interference experienced in the channel, except for the crosstalk intentionally introduced by the channel emulator 112. Assuming that the cables are perfect with unity gain, i.e. there is no crosstalk between the cables or from the cable connectors and there are no losses, the channel of the cables, $H_{cable}$, may be modeled as an identity matrix of order 4. Then the signal received at the DUT 120 may be modeled as (neglecting noise):

$$y = H_L x \quad (1)$$

where x is a column vector consisting of the transmitted signals (x1, x2, x3, x4)' (the prime indicates the transpose of a vector or matrix), $H_L$ is the wireless channel matrix simulated at the channel emulator 112, and y is the signal received at the DUT 120. The channel emulator 112 applies the simulated wireless channel matrix $H_L$ to the signals x1, x2, x3, x4 to mimic crosstalk/interference generated by a wireless channel for UE deployed in the field for the purpose of conformance testing.

Figure 2:
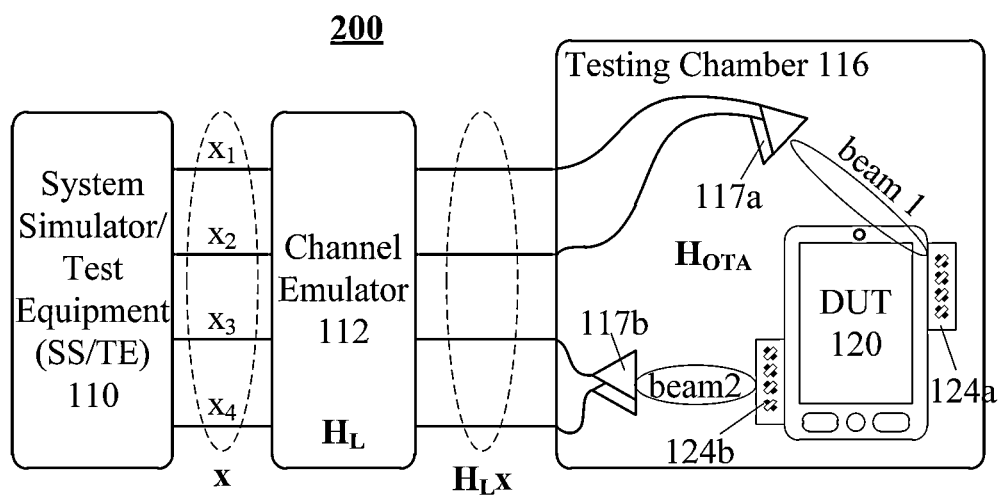
FIG. 2 is a schematic block diagram illustrating an over the air (OTA) test system.

RAN4 are studying requirements for FR2 multi-Rx chain downlink reception, aiming to specify requirements for reception of 4-layer downlink multiple input multiple output (MIMO) signals with simultaneous reception at UE from two different directions. As discussed above, the RF requirements in FR2 need to be verified by over the air (OTA) testing. FIG. 2 schematically illustrates a multi-TRP multi-Rx OTA test system 200, where the testing chamber 116, which is designed as an anechoic chamber in this case, are equipped with multiple probes (also referred to as probe antennas) positioned at different locations for generating beams in different directions. FIG. 2 shows two dual-polarized (i.e. cross-polarized) antenna probes 117a, 117b at two different locations in the testing chamber 116, and each dual-polarized antenna probe 117a, 117b may include two probes with different polarizations. The number of output branches of the channel emulator 112 depends on the number of probes, present in the testing chamber 116, which is 4 in the example shown in FIG. 2. The four probes, collectively denoted by 117, are connected via cables to the four output branches of the channel emulator 112 respectively and then to the four Tx antenna ports of the test equipment 110. As mentioned above, the channel emulator 112 generates a linear combination of the received signals x1, x2, x3, x4 at each output branch, and the linear combination signals are transmitted through the probes 117 to the DUT 120 placed in the testing chamber 116. It would be appreciated that the testing chamber 116 may be equipped with more dual-polarized antenna probes at different locations, and each dual-polarized antenna probe may include at least two probes with different polarizations.

The DUT 120 placed in the testing chamber 116 has two dual-polarized antenna panels/modules 124a, 124b. In an ideal scenario, when the DUT 120 is positioned at a certain location with a certain orientation, the first dual-polarized antenna panel 124a receives a first beam (beam 1) transmitted from the first dual-polarized antenna probe 117a, and the second dual-polarized antenna panel 124b receives a second beam (beam 2) transmitted from the second dual-polarized antenna probe 117b. However, since the wireless link between the dual-polarized antenna probes 117a, 117b and the DUT 120 is an unguided medium, the signal transmitted using a particular polarization of a given probe will be received at both polarizations of both DUT antenna modules/panels, resulting in undesired crosstalk/interference during the testing. Then the signal received at the DUT 120 may be modeled as (neglecting noise):

$$y = H_{OTA} H_L x \quad (2)$$

where x is the column vector consisting of the transmitted signals (x1, x2, x3, x4)', $H_L$ is the wireless channel matrix simulated at the channel emulator 112, $H_{OTA}$ is an innate channel matrix of the OTA testing chamber 116 representing an OTA channel between the probes 117, and the DUT 120, and y is the signal received at the DUT 120.

Mitigation or elimination of the crosstalk/interference introduced within the testing chamber 116 is necessary to achieve correct test results, which can be done by a wireless/virtual cable solution. The wireless/virtual cable is a theoretical concept in which the effective channel between the channel emulator 112 and the DUT antenna modules/panels is designed to be an identity matrix through a suitable calibration operation. More generally, a virtual cable is a technical term used in testing, to describe a connection between two points, or devices, that satisfies a specific set of isolation requirements between the separate links making up the connection. It is defined medium independent and generally understood to extend the concept of a wired cable in environments, where wired cables cannot be used. Furthermore, virtual cable calibration is known to be a process of improving isolation between the links of a virtual cable, until the isolation requirements are satisfied. A challenge for the wireless/virtual cable solution is that the OTA channel matrix $H_{OTA}$ is hard to be characterized, and hence it is difficult to determine a valid virtual cable calibration (VCC) matrix. Current approaches to determine the VCC matrix includes a brute-force phase search method of adjusting the phase in a 360° range to identify an optimal phase of the channel coefficients, which has computational complexity and takes a long estimation time. It would take up to hours to determine a calibration matrix, which is too long to find enough DUT/probe positions for multi-Rx testing with various angles of arrival (AoAs).

Example embodiments of the present disclosure propose a quicker and easier solution to obtain a valid VCC matrix for OTA testing, and potentially with larger isolation. In an example embodiment, the DUT may estimate an overall channel using downlink training signals transmitted from the test equipment, and then send a representation of the estimated overall channel to the test equipment for compensation of an OTA channel portion. The test equipment may derive, from the estimated overall channel, a valid VCC matrix, which pre-compensates the crosstalk/interference introduced in the OTA channel portion, resulting in a wireless/virtual cable connection for the OTA conformance test with performance comparable to the cable connections. Example embodiments also propose three effective methods for the DUT to communicate/transmit the channel representation to the test equipment.

Figure 3:
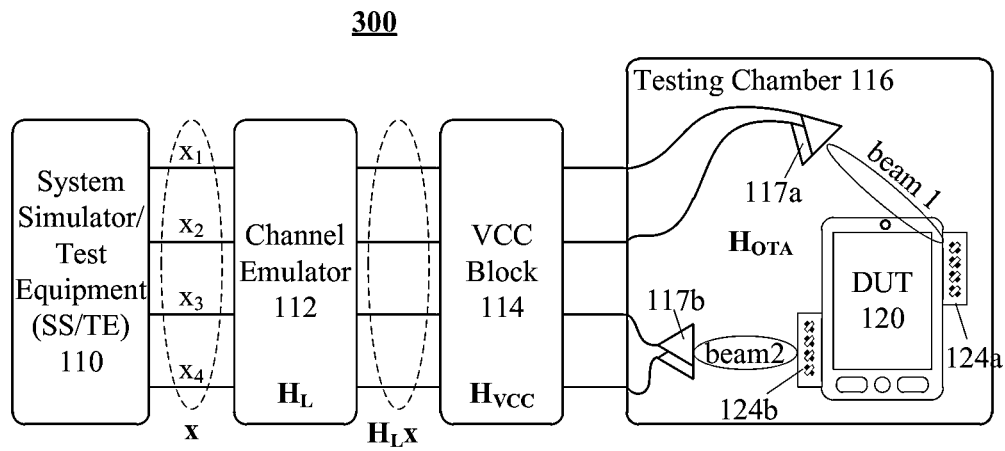
FIG. 3 is a schematic block diagram illustrating an OTA test system including a virtual cable calibration (VCC) block according to an example embodiment of the present disclosure.

FIG. 3 is a schematic block diagram illustrating an OTA test system 300 according to an example embodiment of the present disclosure. The test system 300 includes a virtual cable calibration (VCC) block 114 interposed between the channel emulator 112 and the testing chamber 116 for pre-compensating the effect of OTA channel between the dual-polarized antenna probes 117a, 117b (i.e., the four probes 117) and the DUT 120. The channel emulator 112 and the VCC block 114 may be implemented as separate devices, or they may be integrated as function blocks in the test equipment 110. Also the testing chamber 116 may be implemented as a separate device, or it may be integrated as a function block in the test equipment 110. Other aspects of the test system 300 may be similar to the test system 200 discussed above, and a repetitive description is omitted here.

Figure 4:
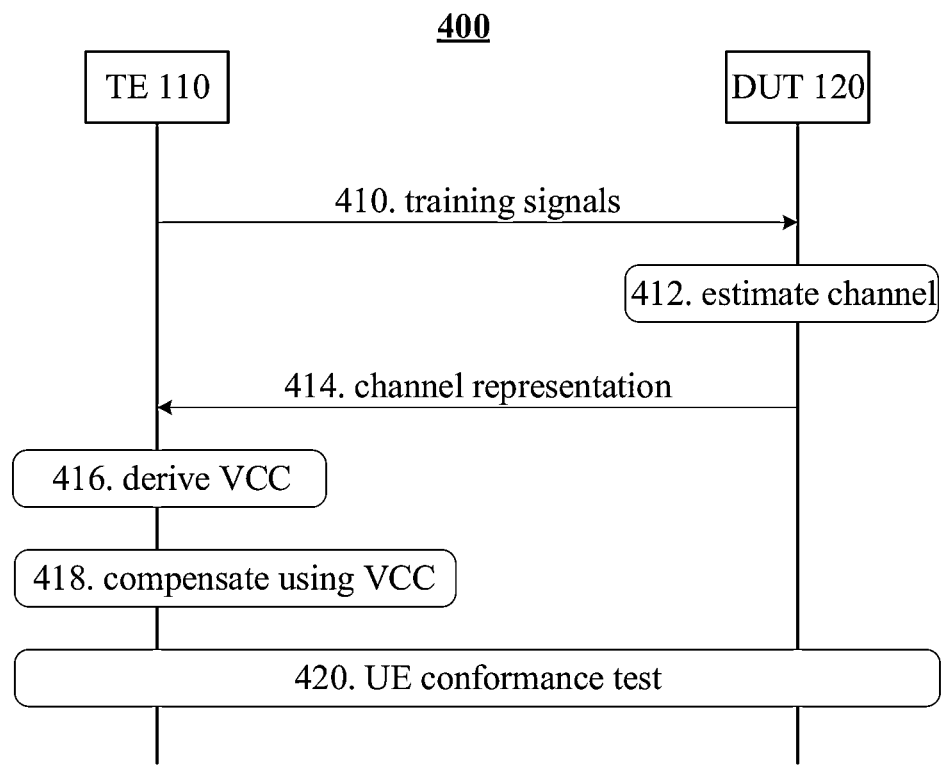
FIG. 4 is a message flow chart illustrating a process according to an example embodiment of the present disclosure.

FIG. 4 is a message flow chart illustrating a process 400 according to an example embodiment of the present disclosure. The process 400 may be performed for example in the test system 300. FIG. 4 shows only the test equipment 110 and the DUT 120. It would be appreciated that the channel emulator 112 and the VCC block 114 may be integrated in the test equipment 110, or operations of the channel emulator 112 and the VCC block 114 implemented as separate devices may become apparent from description below relating to operations of the test equipment 110 and the DUT 120.

Referring to FIG. 4, the test equipment 110 may transmit training signals to the DUT 120 at 410. The training signals may be transmitted from 2P transmit antenna ports of the test equipment 110 and received at 2P receive antenna ports of the DUT 120, where P is an integer greater than one, and the factor 2 is to account for the dual/cross-polarization. Then an overall channel for transmission of the training signals between the 2P transmit antenna ports of the test equipment 110 and the 2P receive antenna ports of the DUT 120 may be represented by a 2P×2P matrix. In the example shown in FIG. 3, P=2 and four training signals x1, x2, x3, x4 are transmitted from 4 transmit antenna ports of the test equipment 110 and received at 4 receive antenna ports of the DUT 120, and hence the overall channel matrix includes 16 elements/coefficients. The training signals may be defined in the time domain, in which case the training signals x1, x2, x3, x4 are transmitted from 4 transmit antenna ports of the test equipment 110, or the training signals may be defined in frequency domain, in which case the training signals are combined into transmit signals x1, x2, x3, x4 and are transmitted from 4 transmit antenna ports of the test equipment 110.

In an example embodiment, the training signals may be reference signals selected from Channel State Information Reference Signal (CSI-RS), Data Demodulation Reference Signal (DM-RS), Primary Synchronization Signal (PSS), Secondary Synchronization Signal (SSS), Tracking Reference Signal (TRS), Phase Tracking Reference Signal (PT-RS), or Positioning Reference Signal (PRS) with dedicated or specific configuration, or they may be communication data. Before transmitting the training signals, the test equipment 110 may transmit configuration of the training signals to the DUT 120 so that the DUT 120 is aware of the training signals to be transmitted from the test equipment 110.

During transmission of the training signals, the wireless channel matrix $H_L$ is applied at the channel emulator 112, and a virtual cable calibration (VCC) matrix $H_{VCC}$ is applied at the VCC block 114. Here it should be noted that the VCC matrix $H_{VCC}$ applied at the VCC block 114 for transmission of the training signals may not be able to compensate the crosstalk/interference introduced in the OTA channel portion within the testing chamber 116, because the test equipment 110 have not received any information about the OTA channel portion. The VCC matrix $H_{VCC}$ applied at the VCC block 114 may be set to a default matrix, which is denoted by $H_{VCCd}$ here to differentiate from a VCC matrix $H_{VCC}$ generated for compensating the OTA channel portion as discussed below. In an example embodiment, the wireless channel matrix $H_L$ and the default VCC matrix $H_{VCCd}$ each may be set to an invertible matrix, i.e. they have inverse matrix $(H_L)^{-1}$ and $(H_{VCCd})^{-1}$, respectively. For instance, the wireless channel matrix $H_L$ and the default VCC matrix $H_{VCCd}$ each may be set to a unitary matrix. The signal received at the DUT 120 may be modeled as (neglecting noise):

$$y = H_{OTA} H_{VCCd} H_L x \qquad (3)$$

where x is the column vector consisting of the transmitted signals (x1, x2, x3, x4)', $H_L$ is the wireless channel matrix simulated at the channel emulator 112, $H_{VCCd}$ is the default VCC matrix applied at the VCC block 114, $H_{OTA}$ is the innate channel matrix of the OTA testing chamber 116, and y is the signal received at the DUT 120. In an example embodiment, in order to simplify subsequent estimation of the OTA channel matrix $H_{OTA}$, the simulated wireless channel matrix $H_L$ and the default VCC matrix $H_{VCC_d}$ may be set to an identity matrix. If both matrices $H_L$ and $H_{VCC_d}$ are set to the identity matrix, the equation 3 may be re-written as (neglecting noise):

$$y = H_{OTA}x. \quad (4)$$

When the DUT 120 receives the training signals from the test equipment 110, the DUT 120 may estimate the channel based on the received training signals at 412. Here the estimation is carried out on the overall channel from the transmit antenna ports of the test equipment 110 to the receive antenna ports of the DUT 120, which includes the OTA channel portion between the dual-polarized antenna probes 117a, 117b (i.e., the four probes 117) and the DUT 120. Since the DUT 120 has knowledge of the training signals x transmitted from the test equipment 110, it can estimate the channel based on the training signals x and the received signal y according to the above equation 3. The DUT 120 may estimate the channel as $H_{OTA}H_{VCC_d}H_L$. In the example shown in FIG. 3, the channel estimation $H_{OTA}H_{VCC_d}H_L$ may be represented by a 4×4 channel matrix.

Then at 414, the DUT 120 may transmit a representation of the estimated channel to the test equipment 110 for compensation of the OTA channel portion, i.e. $H_{OTA}$. The DUT 120 may transmit each element/coefficient of the estimated channel matrix $H_{OTA}H_{VCC_d}H_L$ to the test equipment 110, or it may transmit other information derived from the estimated channel matrix $H_{OTA}H_{VCC_d}H_L$, to the test equipment 110, which will be discussed in detail below.

Upon receiving the channel representation, the test equipment 110 may derive a VCC matrix $H_{VCC}$ for compensation of the OTA channel portion at 416. For instance, the test equipment 110 may first derive the OTA channel matrix $H_{OTA}$ by calculating $H_{OTA}H_{VCC_d}H_L(H_L)^{-1}(H_{VCC_d})^{-1}$, where $(H_L)^{-1}$ and $(H_{VCC_d})^{-1}$ are an inverse or pseudo-inverse of $H_L$ and $H_{VCC_d}$, respectively. If the wireless channel matrix $H_L$ and the default VCC matrix $H_{VCC_d}$ both are set as the identity matrix, the calculation may be omitted and the test equipment 110 may directly take the channel estimation received from the DUT 120 as the OTA channel matrix $H_{OTA}$ according to the above equation 4. Then the test equipment 110 may derive the VCC matrix $H_{VCC}$ for compensating the OTA channel matrix $H_{OTA}$. In an example embodiment, the test equipment 110 may derive the VCC matrix $H_{VCC}$ as an inverse or pseudo-inverse of the OTA channel matrix $H_{OTA}$, i.e. $H_{VCC}=(H_{OTA})^{-1}$.

The test equipment 110 may perform the virtual cable calibration based on the derived VCC matrix $H_{VCC}$ for the conformance test of the DUT 120 at 418. For example, the test equipment 110 may set the VCC block 114 to generate the derived VCC matrix $H_{VCC}=(H_{OTA})^{-1}$. The OTA channel portion, i.e. $H_{OTA}$, would be sufficiently compensated by the VCC matrix $H_{VCC}$ (i.e., the remaining amount of crosstalk is below some given threshold), and a wireless/virtual cable connection would be established between the dual-polarized antenna probes 117a, 117b (i.e., the four probes 117) and the DUT 120 within the testing chamber 116. Then at 420, the test equipment 110 and the DUT 120 may perform the OTA conformance test using the calibrated test system 300.

In the process 400, by the DUT 120 estimating the channel based on the training signals and sending the channel estimation information back to the test equipment 110, the test equipment 120 can quickly and easily find the VCC matrix for compensating the crosstalk/interference introduced in the OTA channel portion. The test equipment 110 can perform calibration using the VCC matrix to establish a wireless/virtual cable connection for the OTA conformance test. The process 400 has reduced computational complexity and lower time cost compared to the existing approaches, and it can accomplish performance comparable to the cable connections. Testing signals transmitted from the test equipment 110 to the DUT 120 via the OTA channel portion would be well isolated as if they were transmitted in cables, which ensures that correct test results would be obtained in the OTA conformance test.

Figure 5:
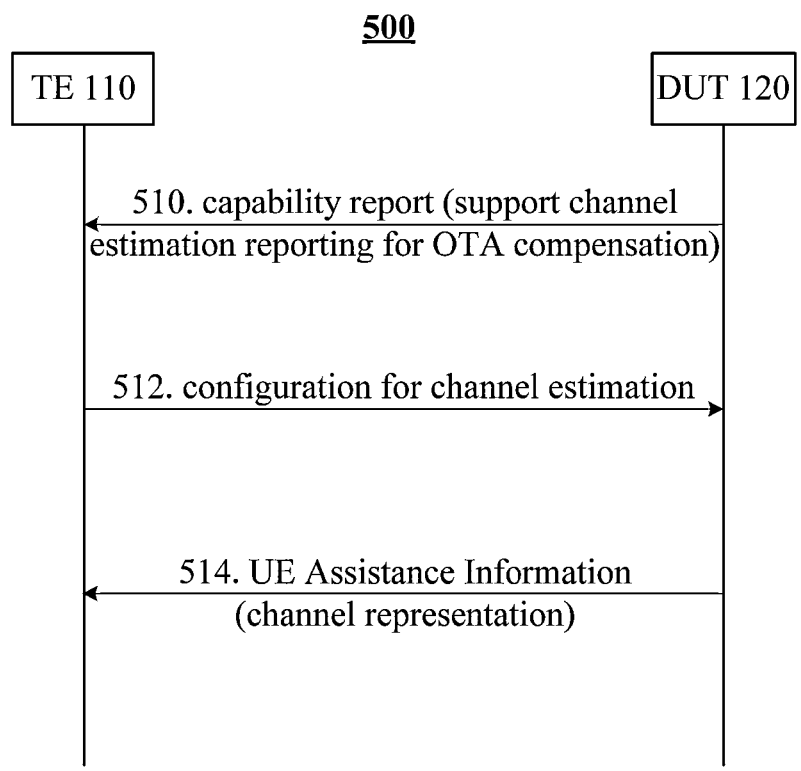
FIG. 5 is a message flow chart illustrating a process according to an example embodiment of the present disclosure.

Some example methods for the DUT 120 to transmit the channel representation to the test equipment 110 are also proposed here. In an example embodiment, the DUT 120 may transmit the channel representation to the test equipment 110 through UE assistance information framework. FIG. 5 illustrates a process 500 for transmitting the channel representation through the UE assistance information framework according to an example embodiment of the present disclosure.

Referring to FIG. 5, at 510, the DUT 120 may report its capability of supporting channel estimation reporting for compensation of the OTA channel portion to the test equipment 110. For example, a new information element (IE) may be defined in a legacy UE capability report message to indicate that the UE (i.e., the DUT 120) has the capability of reporting channel estimation for compensation of the OTA channel portion during the UE conformance test. An example of the new information element in the UE capability report message is shown below:

```
UE-NR-Capability-v1750 : :=         SEQUENCE {
   crossCarrierSchedulingConfigurationRelease-r17      ENUMERATED
{ supported }  OPTIONAL,
   nonCriticalExtension      UE-NR-Capability-vXXXX      OPTIONAL
}
UE-NR-Capability-vXXXX : :=         SEQUENCE {
   Hota-Feedback-Ind-r1X   ENUMERATED { supported }
   OPTIONAL,
   nonCriticalExtension      SEQUENCE { }
                  OPTIONAL
}
```

The field "Hota-Feedback-Ind-r1x" is included and its value is set to "supported" to indicate that the UE is capable of providing the channel estimation feedback for compensation of the OTA channel portion to the test equipment 110.

In response to the capability report received from the DUT 120, the test equipment 110 may send a configuration for channel estimation to the DUT 120 at 512. The configuration may enable the DUT 120 to trigger the UE Assistance Information procedure and report the channel estimation information to the test equipment 110. In an example, the configuration may also prescribe periodicity and/or prohibit time of the channel estimation information reporting. An example of the configuration for channel estimation is shown below:

```
OtherConfig-vXXXX : :=         SEQUENCE {
   Hota-feedback-config-r1X SetupRelease { Hota-Feedback-Config-
r1x}   OPTIONAL
}
Hota-Feedback-Config-r1X: := SEQUENCE {
   Hota-Feedback-Config-ProhibitTimer       ENUMERATED
   { s0, sodot5,
s1, s2, s5, s10, s20, s30, s60, s90, s120, s300, s600, spare3,
spare2, spare1 }
}
```

The field "Hota-feedback-config-r1X" configures the UE (i.e., the DUT 120) to report channel estimation information to inform the base station (i.e., the test equipment 110) about UE estimation of the channel from the Tx antenna ports of the base station to the Rx antenna ports of the UE. The field "Hota-Feedback-Config-ProhibitTimer" indicates a prohibit time for reporting channel estimation information since the last reporting and it may have a value in unit of seconds. The value s0 means the prohibit timer is set to 0 second and thus is disabled, the value s0dot5 means the prohibit timer is set to 0.5 second, the value s1 means the prohibit timer is set to 1 second, and so on. When the prohibit timer is running, the DUT 120 is prohibited from transmitting the channel estimation information to the test equipment 110, thereby preventing too frequent channel estimation reporting and reducing RRC signaling overhead.

When the DUT 120 receives the configuration including the field "Hota-feedback-config-r1X" set to "setup", the DUT 120 will estimate the channel as discussed above and transmit a representation of the channel estimate to the test equipment 110 at 514. In an example, the DUT 120 may periodically estimate the channel and report the channel representation, until it receives a command from the test equipment 110 to stop reporting the channel estimation information. For instance, if the DUT 120 receives a configuration for channel estimation in which the field "Hota-feedback-config-r1X" is set to "release", the DUT 120 will stop reporting the channel estimation information to the test equipment 110. In an example embodiment, the DUT 120 may report a representation of the channel as estimated by the DUT 120 in a UE Assistance Information message, but it can also transmit the channel representation in another message. An example of the UE Assistance Information message including the channel representation is shown below:

| UEAssistanceInformation |
|---|
| -- ASN1START |
| -- TAG-UEASSISTANCEINFORMATION-START |
| UEAssistance Information : :=    SEQUENCE { |
| ... |
| UEAssistance Information-v1700-IEs : := SEQUENCE { |
| ... |
|    propagationDelayDifference-r17   PropagationDelayDifference-r17 OPTIONAL, |
|    nonCriticalExtension   UEAssistance Information-v18xx-IEs OPTIONAL |
| } |
| ... |
| UEAssistanceInformation-v18xx-IEs : := SEQUENCE { |
| OTA-Matrix-Elements-List : := SEQUENCE (SIZE (1...max-Elements-OTA-Matrix) ) OF Elements-OTA-Matrix |
|    nonCriticalExtension   SEQUENCE { }   OPTIONAL |
| } |
| Elements-OTA-Matrix : := SEQUENCE { |
|    element-OTA   OTA-RxPower-Range |
| } |
| max-Elements-OTA-Matrix   INTEGER: := 16 |
| -- TAG-UEASSISTANCEINFORMATION-STOP |
| -- ASN1STOP |

In the example, the proposed "UEAssistanceInformation-v18xx-IEs" contains a field "OTA-Matrix-Elements-List" which is used to send a list of channel coefficients of the estimated channel back to the test equipment 110 for compensation of the OTA channel portion. The field "max-Elements-OTA-Matrix" represents a size of the list, i.e., the number of coefficients/elements included in the 2P×2P channel matrix, which is 16 in the example shown in FIG. 3. The field "OTA-RxPower-Range" indicates the estimated and quantized power value in each coefficient of the estimated channel matrix. In an example embodiment, the field "OTA-RxPower-Range" may have a quantized value in a range from 0 to N−1, where N is the number of quantized levels. For example, if the field "OTA-RxPower-Range" has a value n, the actual value may be calculated as:

$$\text{Actual Value} = L\min + n*(L\max - L\min)/(N-1) dBm \quad (5)$$

where Lmin and Lmax denote the lower and upper limits of the Reference Signal Received Power (RSRP) level to be reported. For the N quantized levels, a quantization step $\Delta$ may be calculated as:

$$\Delta = (L\max - L\min)/(N-1) \quad (6)$$

It would be appreciated that, for a certain range from Lmin to Lmax, a smaller quantization step $\Delta$ would lead to more quantized levels N and hence more bits would be required to transmit the list of channel elements/coefficients. For example, for a channel matrix including 2P*2P coefficients, the list of "OTA-RxPower-Range" has a length of $(2P)^2$*ceil (log 2(N)) bits or (⅛)*$(2P)^2$*ceil (log 2(N)) bytes. The values of Lmin, Lmax and N may be determined as per future 3GPP RAN4 agreements.

In the above example, the quantized power values (i.e., RSRP values) are transmitted as the channel coefficients to the test equipment 110. It would be appreciated that the channel coefficients may include at least one of power, magnitude and phase values. For example, each channel coefficient may include both the magnitude and phase values to define a complex coefficient. The magnitude and phase values may be quantized and transmitted in a similar way, and a repetitive description is omitted here.

Figure 6:
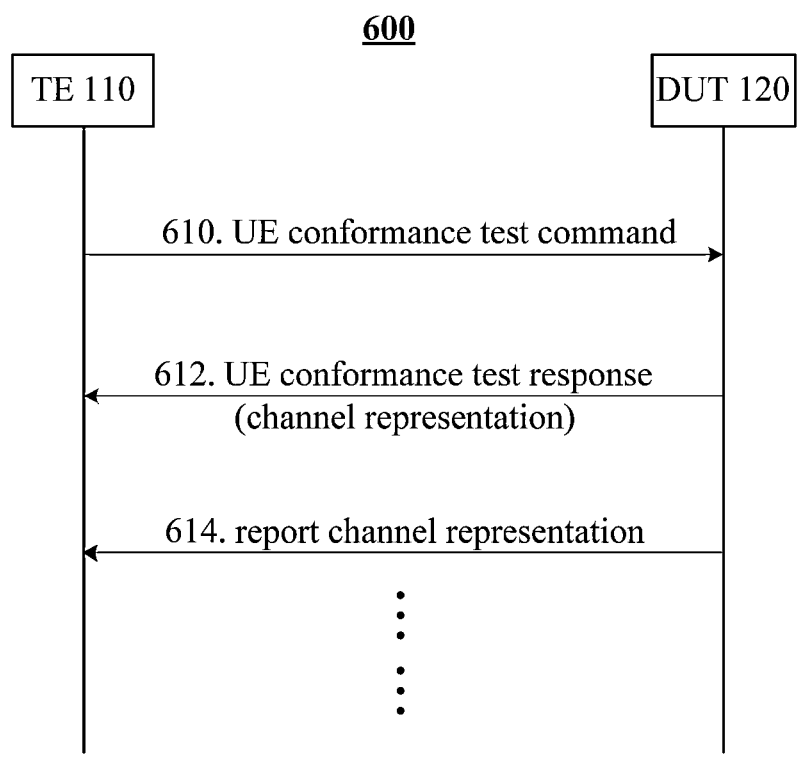
FIG. 6 is a message flow chart illustrating a process according to an example embodiment of the present disclosure.

In another example embodiment, the DUT 120 may transmit the channel representation to the test equipment 110 through a UE special conformance test function. FIG. 6 illustrates a process 600 for transmitting the channel representation through the UE special conformance test function according to an example embodiment of the present disclosure.

Referring to FIG. 6, at 610, the test equipment 120 may send a UE conformance test command to the DUT 120, instructing the DUT 120 to report the channel estimation information for compensation of the OTA channel portion. The UE conformance test command may be transmitted in a Non Access Stratum (NAS) message, which may have a standard Layer 3 message format. In an example embodiment, the UE conformance test command may activate a UE Demodulation Performance Test Preparation Function (UDPTPF) (or a different function, or the function may have a different name) at the DUT 120, by which the DUT 120 performs necessary preparation operations for the UE demodulation performance conformance test, including for example reporting the channel estimation information to the test equipment 110 for compensation of the OTA channel portion. The UDPTPF may be mandatory for UEs operating in FR2.

In response to the received UE conformance test command, the DUT 120 may estimate the channel based on the received training signals and send a representation of the estimated channel, e.g. the quantized channel coefficients, to the test equipment 110 in a UE conformance test response message at 612. The quantization and transmission of the channel coefficients have been described above with respect to the UE assistance information, and a repetitive description is omitted here.

In an example embodiment, the DUT 120 may further periodically report the channel representation to the test equipment 110 at 614. The periodicity of the channel representation reporting may be prescribed in the UE conformance test command or predefined/preconfigured at the DUT 120. The DUT 120 may keep periodically reporting the channel representation until it receives a command to stop doing so from the test equipment 110. For example, if the DUT 120 receives from the test equipment 110 a command to deactivate the UDPTPF function, the DUT 120 would stop reporting the channel representation to the test equipment 110.

Figure 7:
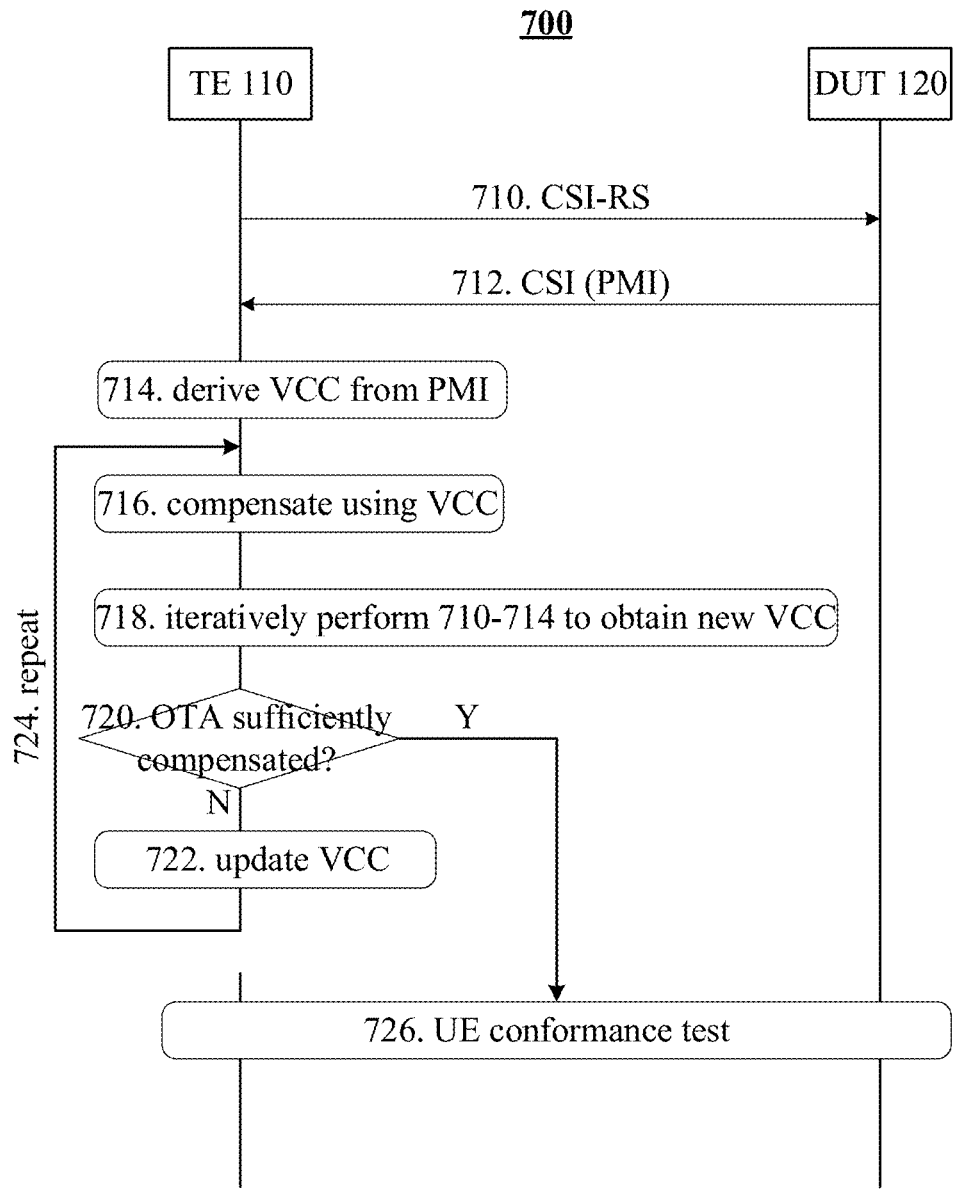
FIG. 7 is a message flow chart illustrating a process according to an example embodiment of the present disclosure.

In another example embodiment, the DUT 120 may transmit the channel representation to the test equipment 110 by re-using the Type II or enhanced Type II (eTypeII) precoding matrix indicator (PMI) feedback framework. FIG. 7 illustrates a process 700 for transmitting the channel representation through the PMI feedback framework according to an example embodiment of the present disclosure.

Referring to FIG. 7, at 710, the test equipment 110 may transmit channel state information reference signals (CSI-RSs), which are configured as the training signals discussed above, to the DUT 120. Before transmitting the CSI-RSs, the test equipment 110 may configure the DUT 120 to receive CSI-RS signals on 2P (P>1) orthogonal CSI-RS ports, and to report measurements for the 2P orthogonal CSI-RS ports either periodically or aperiodically using Type II codebook, enhanced Type II codebook, or an extension thereof. As mentioned above, the DUT 120 may estimate the channel based on the received CSI-RSs.

At 712, the DUT 120 may measure the CSI-RSs and transmit a measurement report containing channel state information (CSI) to the test equipment 110. The CSI may include, among others, a precoding matrix indicator (PMI) determined based on the Type II codebook, the enhanced Type II (eTypeII) codebook, or a further extension thereof. The PMI indicates a precoding matrix, which is associated to the channel estimation determined at the DUT 120. In the example embodiment, the PMI is used as a representation of the estimated channel transmitted to the test equipment 110.

At 714, the test equipment 110 may derive the VCC matrix $H_{VCC}$ from the PMI. For instance, the test equipment 110 may first derive an estimate of the channel from the PMI. In an example embodiment, the test equipment 110 may take the precoding matrix indicated by the PMI as the conjugate transpose of the overall channel matrix, i.e. $(H_{OTA}H_{VCCd}H_L)^H$=PMI_Matrix (the superscript "H" indicates the conjugate transpose/Hermitian of a vector or matrix). Then the test equipment 110 may derive the VCC matrix $H_{VCC}$ from the channel estimate. For instance, the test equipment 110 may first derive the OTA channel matrix $H_{OTA}$ by calculating $H_{OTA}H_{VCCd}H_L(H_L)^{-1}(H_{VCCd})^{-1}$, and then derive the VCC matrix $H_{VCC}$ as an inverse or pseudo-inverse of the OTA channel matrix $H_{OTA}$, i.e. $H_{VCC}= (H_{OTA})^{-1}$.

Optionally, further operations may be performed to refine the derived VCC matrix $H_{VCC}$ if the derived VCC matrix $H_{VCC}$ cannot sufficiently compensate the OTA channel portion. In an example embodiment, the test equipment 110 may compensate the OTA channel portion using the derived VCC matrix $H_{VCC}$ at 716. For instance, the test equipment 110 may set the VCC block 114 to generate the VCC matrix $H_{VCC}$ for compensating the OTA channel portion. The compensated OTA channel portion may be represented as $(H_{OTA}H_{VCC})$.

At 718, the test equipment 110 may iteratively performing the above steps 710-714 to obtain a new VCC matrix $H_{VCC}$. For instance, the test equipment 110 may transmit new CSI-RSs as new training signals to the DUT 120, receive new CSI including a new PMI from the DUT 120, and derive the new VCC matrix $H_{VCC}$ from the new PMI. Here to differentiate the previously obtained VCC matrix and the new VCC matrix, the previous VCC matrix is denoted as $H_{VCCp}$, and the new VCC matrix is denoted as $H_{VCCn}$. The new VCC matrix $H_{VCCn}$ is derived as:

$$H_{VCCn} = (H_{OTA}H_{VCCp})^{-1}. \quad (7)$$

At 720, the test equipment 110 may determine whether the OTA channel portion is sufficiently compensated. For instance, the test equipment 110 may calculate the remaining crosstalk of the compensated OTA channel portion as a matrix norm of the difference between the new VCC matrix $H_{VCCn}$ and the identity matrix. If the remaining crosstalk is below a threshold, the test equipment 110 may determine that the OTA channel portion is sufficiently compensated, and the process 700 may go to a step 726 of performing the UE conformance test using the calibrated test system. If the remaining crosstalk is higher than or equal to the threshold, the test equipment 110 may determine that the OTA channel portion is not sufficiently compensated, and the test equipment 110 may update the previous VCC matrix $H_{VCCp}$ based on the new VCC matrix $H_{VCCn}$ at 722. For instance, the test equipment 110 may update the previous VCC matrix $H_{VCCp}$ using perturbation obtained from the new VCC matrix $H_{VCCn}$. Algorithms may be utilized to determine the perturbation from the new VCC matrix $H_{VCCn}$ such that the updated previous VCC matrix $H_{VCCp}$ can compensate the OTA channel portion better, i.e. further reduce the remaining crosstalk.

At 724, the test equipment 110 may repeatedly perform the steps 716-722, until the OTA channel portion is sufficiently compensated, i.e. the remaining crosstalk is below the threshold. Then the process 700 goes to the step 726 to carry out the UE conformance test.

In the process 700, the VCC matrix $H_{VCC}$ may be trained (i.e. updated) in a number of cycles and finally it can converge to a target matrix that can sufficiently compensate the OTA channel portion. Training algorithms like those used in neural network training processes may be used in the process 700. In an example embodiment, the steps 716-724 may be periodically re-performed to keep the VCC matrix $H_{VCC}$ verified and to ensure accuracy of results in the OTA conformance test.

Figure 8:
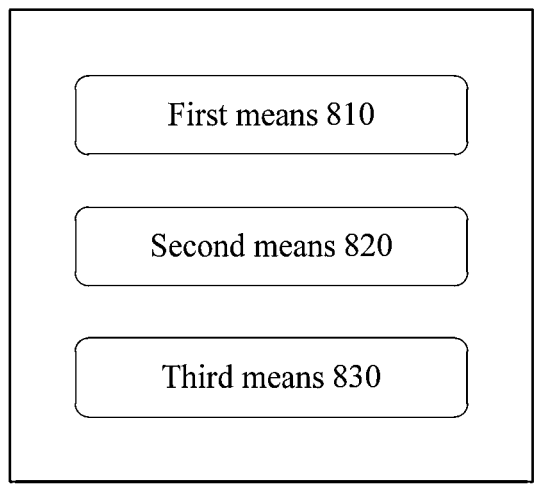
FIG. 8 is a schematic block diagram illustrating an apparatus according to an example embodiment of the present disclosure.

FIG. 8 is a schematic block diagram illustrating an apparatus 800 according to an example embodiment of the present disclosure. The apparatus 800 may be implemented to comprise or to form at least a part of the DUT 120 discussed above to perform at least a part of operations related to the DUT 120. Since the operations related to the DUT 120 have been discussed above with reference to FIGS. 1-7, the blocks of the apparatus 800 will be described briefly here and details thereof may refer to the above description.

Referring to FIG. 8, the apparatus 800 may include a first means 810 for receiving training signals from at least four probes, a second means 820 for estimating a channel based on the received training signals, and a third means 830 for transmitting a representation of the estimated channel to a test equipment coupled to the at least four probes.

In an example embodiment, the apparatus 800 and the at least four probes may be positioned in a testing chamber. The training signals may be transmitted from 2P transmit antenna ports of the test equipment and received at 2P receive antenna ports of the apparatus 800, where P is an integer greater than one. The estimated channel is a channel between the 2P transmit antenna ports and the 2P receive antenna ports, and it includes an over the air, OTA, channel portion between the at least four probes and the apparatus 800. The apparatus 800 transmits the channel representation to the test equipment for compensation of the OTA channel portion.

In an example embodiment, the third means 830 may transmit the channel representation to the test equipment in a user equipment assistance information message. The apparatus 800 may further include a fourth means (not shown) for reporting capability of supporting channel estimation reporting for compensation of the OTA channel portion to the test equipment, and a fifth means (not shown) for receiving a configuration for estimating the channel from the test equipment. The apparatus 800 may transmit the channel representation to the test equipment according to the received configuration for channel estimation.

In an example embodiment, the third means 830 may transmit the channel representation to the test equipment through a user equipment special conformance test function. For instance, the apparatus 800 may further include a sixth means (not shown) for receiving a user equipment conformance test command from the test equipment, and a seventh means (not shown) for transmitting, in response to the user equipment conformance test command, a user equipment conformance test response including the channel representation to the test equipment.

In an example embodiment, the channel representation transmitted to the test equipment may be encoded as a list of channel coefficients of the channel, and the channel coefficients may include at least one of power, magnitude and phase values.

In an example embodiment, the third means 830 may transmit the channel representation to the test equipment through a precoding matrix indicator, PMI, feedback using a Type II codebook, an enhanced Type II codebook, or a further extension thereof. For instance, the apparatus 800 may further include an eighth means (not shown) for receiving channel state information reference signals transmitted from the test equipment as the training signals, and a ninth means (not shown) for transmitting a measurement report of the channel state information reference signals to the test equipment. The measurement report includes a PMI determined based on the Type II codebook, the enhanced Type II codebook, or the further extension thereof. The PMI indicates a precoding matrix associated with the estimated channel.

In an example embodiment, the eighth means and the ninth means may be configured to repeatedly perform the operations of receiving the channel state information reference signals and transmitting the measurement report until the OTA channel portion is sufficiently compensated.

Figure 9:
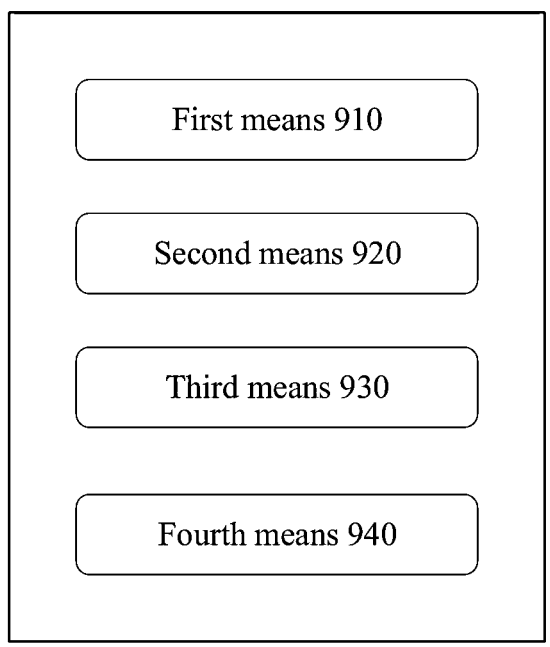
FIG. 9 is a schematic block diagram illustrating an apparatus according to an example embodiment of the present disclosure.

FIG. 9 is a schematic block diagram illustrating an apparatus 900 according to an example embodiment of the present disclosure. The apparatus 900 may be implemented to comprise or to form at least a part of the test equipment 110 discussed above to perform at least a part of operations related to the test equipment 110. Since the operations related to the test equipment 110 have been discussed above with reference to FIGS. 1-7, the blocks of the apparatus 900 will be described briefly here and details thereof may refer to the above description.

Referring to FIG. 9, the apparatus 900 may include a first means 910 for transmitting training signals to a terminal device through at least four probes, a second means 920 for receiving from the terminal device a representation of a channel as estimated by the terminal device, a third means 930 for deriving a virtual cable calibration matrix from the channel representation, and a fourth means 940 for compensating for the OTA channel portion using the virtual cable calibration matrix.

In an example embodiment, the terminal device and the at least four probes may be positioned in a testing chamber. The training signals may be transmitted from 2P transmit antenna ports of the apparatus 900 and received at 2P receive antenna ports of the terminal device, where P is an integer greater than one. The channel estimated by the terminal device is a channel between the 2P transmit antenna ports and the 2P receive antenna ports, and it includes an over the air, OTA, channel portion between the at least four probes and the terminal device. The apparatus 900 derives the virtual cable calibration matrix from the received channel representation for compensation of the OTA channel portion.

In an example embodiment, the apparatus 900 may receive the channel representation from the terminal device in a user equipment assistance information message. The apparatus 900 may further include a fifth means (not shown) for receiving from the terminal device a capability report indicative of capability for supporting channel estimation reporting for compensation of the OTA channel portion, and a sixth means (not shown) for transmitting a configuration for estimating the channel to the terminal device. The terminal device may transmit the channel representation to the apparatus 900 according to the received configuration for channel estimation.

In an example embodiment, the apparatus 900 may receive the channel representation from the terminal device through a user equipment special conformance test function. For instance, the apparatus 900 may further include a seventh means (not shown) for transmitting to the terminal device a user equipment conformance test command, and an eighth means (not shown) for receiving, in response to the user equipment conformance test command, a user equipment conformance test response including the channel representation from the terminal device.

In an example embodiment, the channel representation received at the apparatus 900 may be encoded as a list of channel coefficients of the estimated channel, and the channel coefficients may include at least one of power, magnitude and phase values.

In an example embodiment, the apparatus 900 may receive the channel representation from the terminal device through a precoding matrix indicator, PMI, feedback using a Type II codebook, an enhanced Type II codebook, or a further extension thereof. For instance, the apparatus 900 may include a ninth means (not shown) for transmitting channel state information reference signals as the training signals to the terminal device, a tenth means (not shown) for receiving from the terminal device a measurement report of the channel state information reference signals including a PMI determined based on the Type II codebook, the enhanced Type II codebook, or the further extension thereof, an eleventh means (not shown) for deriving a virtual cable calibration matrix from the PMI, and a twelfth means for compensating for the OTA channel portion using the virtual cable calibration matrix.

In an example embodiment, the apparatus 900 may further include a thirteenth means (not shown) for iterating through the ninth, tenth, and eleventh means to iteratively perform their operations to obtain a new virtual cable calibration matrix, a fourteenth means (not shown) for updating the virtual cable calibration matrix with perturbation obtained from the new virtual cable calibration matrix, and the twelfth means for compensating for the OTA channel portion using the updated virtual cable calibration matrix, until the OTA channel portion is sufficiently compensated.

In an example embodiment, the apparatus 900 may further include a fifteenth means (not shown) for performing the user equipment conformance test after the apparatus 900 is calibrated, i.e. after the OTA channel portion is sufficiently compensated.

Figure 10:
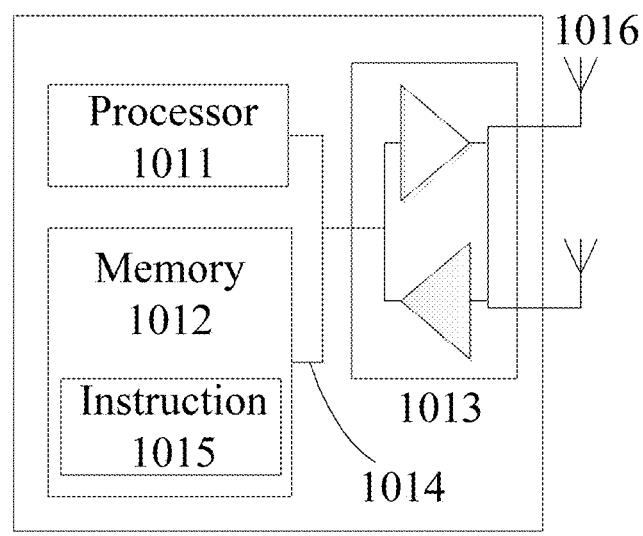
FIG. 10 is a schematic block diagram illustrating a terminal device according to an example embodiment of the present disclosure.

FIG. 10 is a schematic block diagram illustrating a terminal device 1000 according to an example embodiment of the present disclosure. The terminal device 1000 may be implemented as the DUT 120 discussed above.

As shown in FIG. 10, the terminal device 1000 may include one or more processors 1011, one or more memories 1012 and one or more transceivers 1013 interconnected through one or more buses 1014. The one or more buses 1014 may be address, data, or control buses, and may include any interconnection mechanism such as series of lines on a motherboard or integrated circuit, fiber, optics or other optical communication equipment, and the like. Each of the one or more transceivers 1013 may comprise a receiver and a transmitter, which are connected to one or more antennas 1016. The one or more antennas 1016 may include for example two dual-polarized antenna panels. The terminal device 1010 may wirelessly communicate with a radio access network through the one or more antennas 1016. The one or more memories 1012 may include instructions 1015 which, when executed by the one or more processors 1011, may cause the terminal device 1000 to perform operations and procedures relating to the DUT 120 as described above.

Figure 11:
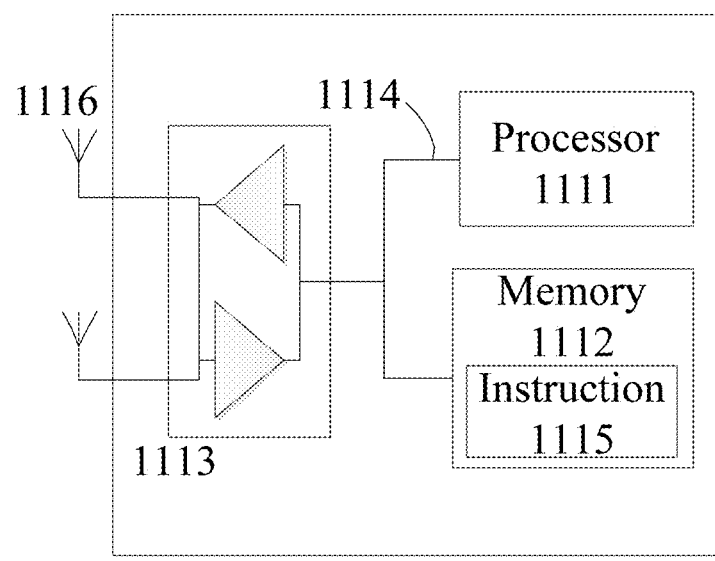
FIG. 11 is a schematic block diagram illustrating a test equipment device according to an example embodiment of the present disclosure.

FIG. 11 is a schematic block diagram illustrating a test equipment 1100 according to an example embodiment of the present disclosure. The test equipment 1100 may be implemented as the test equipment 110 discussed above.

As shown in FIG. 11, the test equipment 1100 may include one or more processors 1111, one or more memories 1112 and one or more transceivers 1113 interconnected through one or more buses 1114. The one or more buses 1114 may be address, data, or control buses, and may include any interconnection mechanism such as a series of lines on a motherboard or integrated circuit, fiber, optics or other optical communication equipment, and the like. Each of the one or more transceivers 1113 may comprise a receiver and a transmitter, which are connected to one or more antennas 1116. The one or more antennas 1116 may include for example at least two dual-polarized antenna panels, which may be positioned at different locations within a testing chamber (not shown), and each panel may include at least two probes. The test equipment 1100 may simulate behaviours of a base station to transmit signals towards the terminal device 1000 shown in FIG. 10. In an example embodiment, the test equipment 1100 may transmit, through the one or more antennas 1116, a plurality of beams in different directions towards the terminal device 1000. The one or more memories 1112 may include instructions 1115 which, when executed by the one or more processors 1111, may cause the test equipment 1100 to perform operations and procedures relating to the test equipment 110 as described above.

The one or more processors 1011, 1111 discussed above may be of any appropriate type that is suitable for the local communication network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 1011, 1111 may be configured to control other elements of the terminal device/test equipment and operate in cooperation with them to implement the procedures discussed above.

The one or more memories 1012, 1112 may include at least one storage medium in various forms, such as a transitory memory and/or a non-transitory memory. The transitory memory may include, but not limited to, for example, a random access memory (RAM) or a cache. The non-transitory memory may include, but not limited to, for example, a read only memory (ROM), a hard disk, a flash memory, and the like. The term "non-transitory," as used herein, is a limitation of the medium itself (i.e., tangible, not a signal) as opposed to a limitation on data storage persistency (e.g., RAM vs. ROM). Further, the one or more memories 1012, 1112 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide program instruction or instructions which, when executed by one or more processors, may cause a device or apparatus to perform the procedures described above. The program instruction for carrying out procedures of the exemplary embodiments may be written in any combination of one or more programming languages. The program instruction may be provided to one or more processors or controllers of a general purpose computer, special purpose computer, or other programmable data processing apparatus, such that the program instruction, when executed by the processor or controller, cause the functions/operations specified in the flowcharts and/or block diagrams to be implemented. The program instruction may execute entirely on a machine, partly on the machine, as a stand-alone software package, partly on the machine and partly on a remote machine or entirely on the remote machine or server.

Some exemplary embodiments further provide a computer program product or a computer readable medium having the program instruction or instructions stored therein.

The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A first device for compensating crosstalk introduced in an over the air (OTA) channel portion, the first device comprising:
at least one processor; and
at least one memory storing instructions that, when executed by the at least one processor, cause the first device at least to perform:
transmitting training signals to a second device through at least four probes via a channel of cables, the second device and the at least four probes being positioned in a testing chamber;
receiving, from the second device through a precoding matrix indicator (PMI) feedback using a Type II codebook, a channel representation as estimated by the second device, the channel including the OTA channel portion between the at least four probes and the second device;
receiving, from the second device, a measurement report of a channel state information reference signals including a PMI determined based on the Type II codebook;
deriving, from the channel representation and PMI, a virtual cable calibration matrix for compensation of the OTA channel portion;
determining a compensation for the OTA channel portion using the virtual cable calibration matrix;
calculating a crosstalk of the compensated OTA channel portion as a matrix norm of a difference between the virtual cable calibration matrix and an identity matrix, wherein the channel of the cables is modeled as that identity matrix of order 4;
based on the calculating, determining that the compensation for the OTA channel portion does not reduce the crosstalk below a threshold; and
iterating through the following operations until the OTA channel portion is compensated such that the crosstalk is below the threshold:
transmitting, to the second device, new channel state information reference signals as new training signals;
receiving, from the second device, a new measurement report of the new channel state information reference signals including a new PMI determined based on the Type II codebook;
deriving a new virtual cable calibration matrix from the new PMI;
updating the virtual cable calibration matrix with perturbation obtained from the new virtual cable calibration matrix; and
compensating for the OTA channel portion using the updated virtual cable calibration matrix.

2. The first device of claim 1, wherein the training signals are transmitted from 2P transmit antenna ports of the first device, and the training signals are received at 2P receive antenna ports of the second device, wherein P is an integer greater than one, and
the channel is a channel between the 2P transmit antenna ports and the 2P receive antenna ports.

3. The first device of claim 2, wherein the channel representation is received from the second device in a user equipment assistance information message.

4. The first device of claim 3, wherein the at least one memory further stores instructions that, when executed by the at least one processor, cause the first device at least to perform, before receiving the channel representation from the second device:
receiving, from the second device, a capability report indicative of capability for supporting channel estimation reporting for compensation of the OTA channel portion; and
transmitting, to the second device, a configuration for estimating the channel.

5. The first device of claim 4, wherein the channel representation is received from the second device through a user equipment special conformance test function.

6. The first device of claim 5, wherein the at least one memory further stores instructions that, when executed by the at least one processor, cause the first device at least to perform:
transmitting, to the second device, a user equipment conformance test command; and receiving, from the second device, and in response to the user equipment conformance test command, a user equipment conformance test response including the channel representation.

7. The first device of claim 6, wherein the channel representation is encoded as a list of channel coefficients of the channel, the channel coefficients including power, magnitude and phase values.

8. A system for compensating crosstalk introduced in an over the air (OTA) channel portion, the system comprising:
at least one processor; and
at least one memory storing instructions that, when executed by the at least one processor, cause the first device at least to perform:
transmitting training signals to a second device through at least four probes via a channel of cables, the second device and the at least four probes being positioned in a testing chamber;
receiving, from the second device through a precoding matrix indicator (PMI) feedback using a Type II codebook, a channel representation as estimated by the second device, the channel including the OTA channel portion between the at least four probes and the second device;
receiving, from the second device, a measurement report of a channel state information reference signals including a PMI determined based on the Type II codebook;
deriving, from the channel representation and PMI, a virtual cable calibration matrix for compensation of the OTA channel portion;
determining a compensation for the OTA channel portion using the virtual cable calibration matrix;
calculating a crosstalk of the compensated OTA channel portion as a matrix norm of a difference between the virtual cable calibration matrix and an identity matrix, wherein the channel of the cables is modeled as that identity matrix of order 4;
based on the calculating, determining that the compensation for the OTA channel portion does not reduce the crosstalk below a threshold; and
iterating through the following operations until the OTA channel portion is compensated such that the crosstalk is below the threshold:
transmitting, to the second device, new channel state information reference signals as new training signals;
receiving, from the second device, a new measurement report of the new channel state information reference signals including a new PMI determined based on the Type II codebook;
deriving a new virtual cable calibration matrix from the new PMI;
updating the virtual cable calibration matrix with perturbation obtained from the new virtual cable calibration matrix; and
compensating for the OTA channel portion using the updated virtual cable calibration matrix.

9. The system of claim 8, wherein the training signals are transmitted from 2P transmit antenna ports of the first device, and the training signals are received at 2P receive antenna ports of the second device, wherein P is an integer greater than one, and
the channel is a channel between the 2P transmit antenna ports and the 2P receive antenna ports.

10. The system of claim 9, wherein the channel representation is received from the second device in a user equipment assistance information message.

11. The system of claim 10, wherein the at least one memory further stores instructions that, when executed by the at least one processor, cause the first device at least to perform, before receiving the channel representation from the second device:
receiving, from the second device, a capability report indicative of capability for supporting channel estimation reporting for compensation of the OTA channel portion; and
transmitting, to the second device, a configuration for estimating the channel.

12. The system of claim 11, wherein the channel representation is received from the second device through a user equipment special conformance test function.

13. The system of claim 12, wherein the at least one memory further stores instructions that, when executed by the at least one processor, cause the first device at least to perform:
transmitting, to the second device, a user equipment conformance test command; and
receiving, from the second device, and in response to the user equipment conformance test command, a user equipment conformance test response including the channel representation.

14. The system of claim 13, wherein the channel representation is encoded as a list of channel coefficients of the channel, the channel coefficients including power, magnitude and phase values.

15. A method for compensating crosstalk introduced in an over the air (OTA) channel portion, the method comprising:
transmitting, from a first device, training signals to a second device through at least four probes via a channel of cables, the second device and the at least four probes being positioned in a testing chamber;
receiving, from the second device through a precoding matrix indicator (PMI) feedback using a Type II codebook, a channel representation as estimated by the second device, the channel including the OTA channel portion between the at least four probes and the second device;
receiving, from the second device, a measurement report of a channel state information reference signals including a PMI determined based on the Type II codebook;
deriving, from the channel representation and PMI, a virtual cable calibration matrix for compensation of the OTA channel portion;
determining a compensation for the OTA channel portion using the virtual cable calibration matrix;
calculating a crosstalk of the compensated OTA channel portion as a matrix norm of a difference between the virtual cable calibration matrix and an identity matrix, wherein the channel of the cables is modeled as that identity matrix of order 4;
based on the calculating, determining that the compensation for the OTA channel portion does not reduce the crosstalk below a threshold; and
iterating through the following operations until the OTA channel portion is compensated such that the crosstalk is below the threshold:
transmitting, to the second device, new channel state information reference signals as new training signals;

receiving, from the second device, a new measurement report of the new channel state information reference signals including a new PMI determined based on the Type II codebook;

deriving a new virtual cable calibration matrix from the new PMI;

updating the virtual cable calibration matrix with perturbation obtained from the new virtual cable calibration matrix; and compensating for the OTA channel portion using the updated virtual cable calibration matrix.

16. The method of claim 15, wherein the training signals are transmitted from 2P transmit antenna ports of the first device, and the training signals are received at 2P receive antenna ports of the second device, wherein P is an integer greater than one, and the channel is a channel between the 2P transmit antenna ports and the 2P receive antenna ports.

17. The method of claim 16, wherein the channel representation is received from the second device in a user equipment assistance information message.

18. The method of claim 17, further comprising: before receiving the channel representation from the second device:

receiving, from the second device, a capability report indicative of capability for supporting channel estimation reporting for compensation of the OTA channel portion; and transmitting, to the second device, a configuration for estimating the channel.

19. The method of claim 18, wherein the channel representation is received from the second device through a user equipment special conformance test function.

20. The method of claim 19, further comprising:

transmitting, to the second device, a user equipment conformance test command; and receiving, from the second device, and in response to the user equipment conformance test command, a user equipment conformance test response including the channel representation.

* * * * *